(12) United States Patent
Park et al.

(10) Patent No.: US 12,487,507 B2
(45) Date of Patent: Dec. 2, 2025

(54) CAMERA MODULE

(71) Applicant: LG INNOTEK CO., LTD., Seoul (KR)

(72) Inventors: Jong Hyun Park, Seoul (KR); Jung Young Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 410 days.

(21) Appl. No.: 18/009,646

(22) PCT Filed: Jun. 22, 2021

(86) PCT No.: PCT/KR2021/007790
§ 371 (c)(1),
(2) Date: Dec. 9, 2022

(87) PCT Pub. No.: WO2021/261873
PCT Pub. Date: Dec. 30, 2021

(65) Prior Publication Data
US 2023/0259006 A1    Aug. 17, 2023

(30) Foreign Application Priority Data

Jun. 25, 2020    (KR) ......................... 10-2020-0077621

(51) Int. Cl.
*G03B 17/12* (2021.01)
*G02B 7/14* (2021.01)
*G02B 27/00* (2006.01)

(52) U.S. Cl.
CPC ............... *G03B 17/12* (2013.01); *G02B 7/14* (2013.01); *G02B 27/0006* (2013.01)

(58) Field of Classification Search
CPC ....... G03B 17/12; G02B 7/14; G02B 27/0006
See application file for complete search history.

(56) References Cited

U.S. PATENT DOCUMENTS

2007/0253061 A1    11/2007  Liu
2011/0063498 A1    3/2011   An et al.
(Continued)

FOREIGN PATENT DOCUMENTS

CN    108474999 A    8/2018
CN    109644228 A    4/2019
(Continued)

OTHER PUBLICATIONS

KR 20150104787 A machine translation (Year: 2015).*
KR 20190012339 A machine translation (Year: 2019).*

*Primary Examiner* — James A Dudek
(74) *Attorney, Agent, or Firm* — Birch, Stewart, Kolasch & Birch, LLP

(57) ABSTRACT

The present embodiment relates to a camera module comprising: a first body; a lens holder coupled to the first body; and a second body coupled to the first body. The lens holder comprises a first coupling part comprising a first portion, which protrudes from the outer peripheral surface of the lens holder, and a second portion which extends towards the first body from the first portion. The first body comprises a second coupling part which can be coupled to the first coupling part. The second portion of the first coupling part comprises screw threads formed on the inner peripheral surface of the second portion. The second coupling part comprises screw threads formed on the outer peripheral surface of the second coupling part.

20 Claims, 12 Drawing Sheets

(56) References Cited

U.S. PATENT DOCUMENTS

| | | |
|---|---|---|
| 2018/0224622 A1 | 8/2018 | Han et al. |
| 2019/0025674 A1 | 1/2019 | Hwang et al. |
| 2019/0033553 A1 | 1/2019 | Jeong |
| 2019/0353987 A1 | 11/2019 | Choi et al. |
| 2020/0301094 A1 | 9/2020 | Choi |

FOREIGN PATENT DOCUMENTS

| | | |
|---|---|---|
| JP | 2002-290792 A | 10/2002 |
| JP | 2013-37189 A | 2/2013 |
| KR | 10-2011-0028767 A | 3/2011 |
| KR | 10-2012-0139219 A | 12/2012 |
| KR | 10-2015-0104787 A | 9/2015 |
| KR | 10-2016-0104316 A | 9/2016 |
| KR | 10-2018-0065504 A | 6/2018 |
| KR | 10-2019-0012339 A | 2/2019 |
| KR | 10-2019-0036281 A | 4/2019 |

\* cited by examiner

CAMERA MODULE

CROSS REFERENCE TO RELATED APPLICATIONS

This application is the National Phase of PCT International Application No. PCT/KR2021/007790, filed on Jun. 22, 2021, which claims priority under 35 U.S.C. 119(a) to Patent Application No. 10-2020-0077621, filed in the Republic of Korea on Jun. 25, 2020, all of which are hereby expressly incorporated by reference into the present application.

TECHNICAL FIELD

The present embodiment relates to a camera module.

BACKGROUND ART

Recently, ultra-small camera modules are being developed, and ultra-small camera modules are widely used in small electronic products such as smartphones, laptops, and game consoles.

As the spread of automobiles becomes more popular, ultra-small cameras are widely used not only in small electronic products but also in vehicles. For example, black box cameras for vehicle protection or objective data of traffic accidents, rear surveillance cameras that allow drivers to monitor blind spots at the rear of the vehicle through screens to ensure safety when reversing the vehicle, and peripheral detection cameras capable of monitoring the surroundings of the vehicle, and the like are provided.

The conventional camera module has a problem in that a thread structure is formed on an outer circumferential surface of the lens holder and an inner circumferential surface of the front body, respectively, so that foreign substances are generated when assembling or by vibration of a vehicle.

In addition, there is a problem in that foreign substances fall to the surface of the image sensor and cause a black pixel phenomenon.

In addition, there is a problem of poor assembly and poor waterproofing since foreign substances are introduced into the waterproof O-ring being disposed between the lens holder and the front body.

DETAILED DESCRIPTION OF THE INVENTION

Technical Subject

The camera module according to the present embodiment is intended to provide a camera module that prevents foreign substances from falling to the image sensor surface by changing the position of the screw thread coupling structure between the lens holder and the front body.

In addition, it is intended to provide a camera module that minimizes assembly man-hours and assembly defects by eliminating the O-ring application structure.

In addition, it is intended to provide a camera module that can firmly fix the lens holder and perform a waterproof function by applying epoxy between the lens holder and the front body.

Technical Solution

A camera module according to the present embodiment comprises: a first body; a lens holder being coupled to the first body; and a second body being coupled to the first body, wherein the lens holder includes a first coupling part including a first portion being protruded from an outer peripheral surface of the lens holder and a second portion being extended towards the first body from the first portion, wherein the first body includes a second coupling part being coupled to the first coupling part, wherein the second portion of the first coupling part includes screw threads being formed on an inner peripheral surface of the second portion, and wherein the second coupling part includes screw threads being formed on an outer peripheral surface of the second coupling part.

The second coupling part is protruded from an upper surface of the first body, and the first coupling part includes a groove being recessed from a lower end of the second part of the first coupling part, and at least a portion of the second coupling part may be inserted into the groove of the first coupling part.

It includes a substrate assembly disposed in the second body, wherein the substrate assembly includes a substrate and an image sensor being disposed in the substrate, and wherein the first coupling part and the second coupling part may not be overlapped with the image sensor in an optical axis direction.

It includes a substrate assembly being disposed in the second body, wherein the substrate assembly includes a substrate and an image sensor being disposed on the substrate, and wherein the first coupling part and the second coupling part may be disposed at more outer side than the image sensor.

An outer peripheral surface of the lens holder may be in contact with an inner peripheral surface of the first body, and the outer peripheral surface of the lens holder and the inner peripheral surface of the first body may be formed without a screw thread.

The screw thread of the first coupling part and the screw thread of the second coupling part may be screw-coupled.

The first body includes: a protruded portion being protruded from the upper surface of the first body and being disposed at more outer side than the second coupling part; and a groove being formed between the second coupling part and the protruded portion, wherein a fixing member may be disposed in the groove of the first body.

The fixing member includes: a body being disposed in the groove of the first body; and an extension portion being extended from at least a portion of the body, wherein the extension portion of the fixing member may be disposed between the inner peripheral surface of the first coupling part and the outer peripheral surface of the second coupling part.

The protruded portion of the first body is not overlapped with the first coupling part of the lens holder in a direction perpendicular to the optical axis direction, and the second portion of the first coupling part may be overlapped with the groove of the first body in an optical axis direction.

The extension portion of the fixing member may fix the lens holder to the first body.

The second portion of the first coupling part may be spaced apart from the outer peripheral surface of the lens holder in a direction perpendicular to an optical axis direction.

A camera module according to the present embodiment comprises: a first body; a lens holder being coupled to the first body; a second body being coupled to the first body; and a substrate assembly being disposed in the second body, wherein the lens holder includes a first coupling part being protruded from an outer peripheral surface of the lens holder, wherein the first coupling part includes a groove being recessed from a lower end of the first coupling part, wherein the first body includes a second coupling part being protruded from an upper surface of the first body and at least a portion of which is disposed in the groove of the first coupling part, and wherein the first coupling part and the second coupling part may be screw-coupled.

The substrate assembly includes a substrate and an image sensor being disposed in the substrate, and the first coupling part and the second coupling part may not be overlapped with the image sensor in an optical axis direction.

The substrate assembly includes a substrate and an image sensor disposed on the substrate, and the first coupling part and the second coupling part may be disposed at more outer side than the image sensor.

A screw thread is formed on an outer peripheral surface of the second coupling part; a screw thread corresponding to the screw thread of the outer peripheral surface of the second coupling part is formed in a surface facing the outer peripheral surface of the second coupling part of the groove of the first coupling part; an outer peripheral surface of the lens holder is in contact with an inner peripheral surface of the first body; and the outer peripheral surface of the lens holder and the inner peripheral surface of the first body may be formed without a screw thread.

Advantageous Effects

The camera module according to the present embodiment can prevent foreign substances from falling to the image sensor surface by changing the position of the screw thread coupling structure between the lens holder and the front body.

In addition, it is possible to minimize assembly manhours and assembly defects by eliminating the O-ring structure being applied therewith.

In addition, by applying epoxy between the lens holder and the front body, waterproofing function can be performed while firmly fixing the lens holder

EMBODIMENT

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under) ", the meaning of not only an upward direction but also a downward direction based on one component may be included.

Hereinafter, the camera module 10 according to an embodiment of the present invention will be described in more detail with reference to the accompanying drawings.

Figure 1:
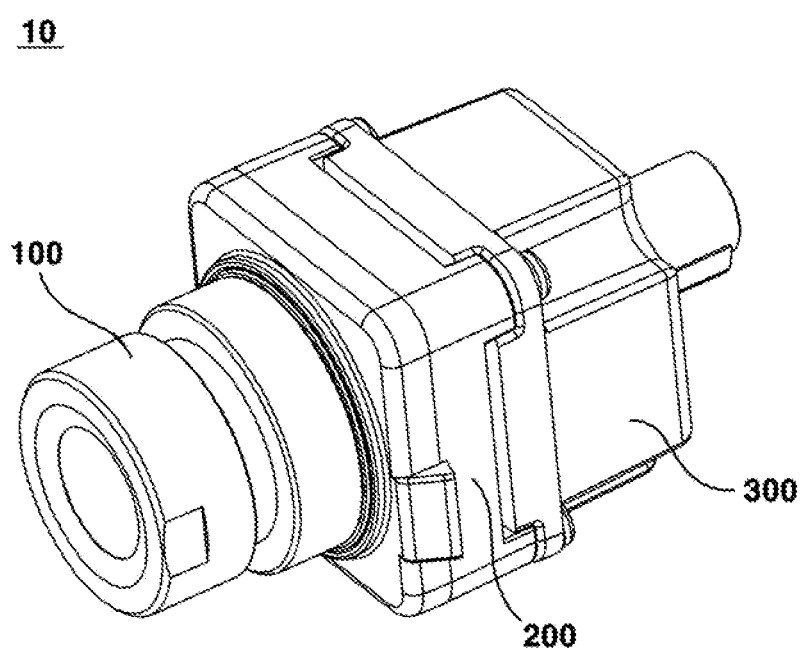
FIG. 1 is a perspective view of a camera module according to the present embodiment.
Figure 2:
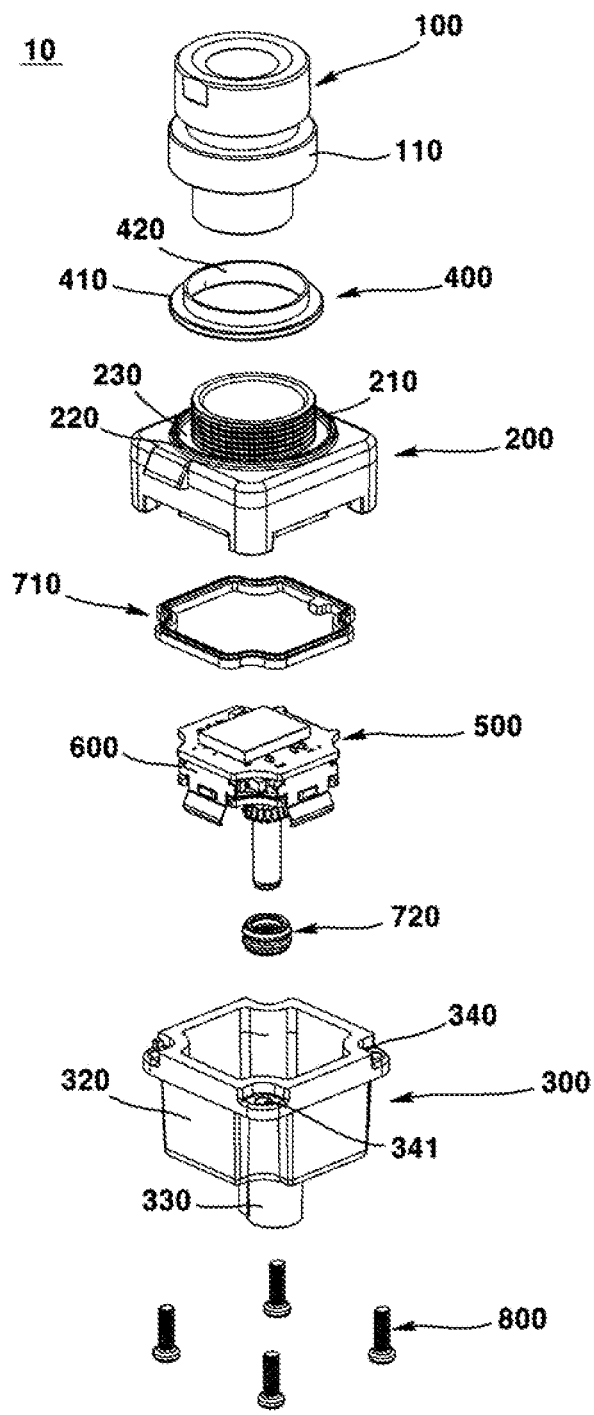
FIG. 2 is an exploded perspective view of a camera module according to the present embodiment viewed from the upper direction.
Figure 3:
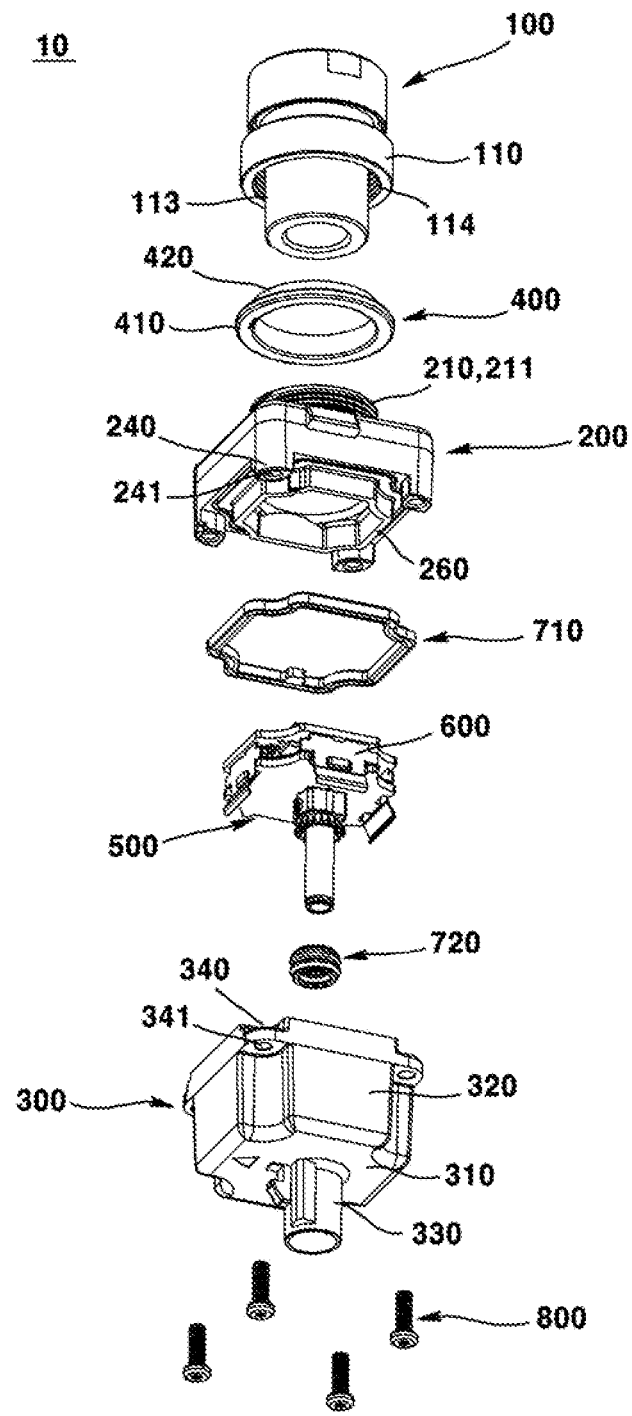
FIG. 3 is an exploded perspective view of a camera module according to the present embodiment viewed from the downward direction.

FIG. 1 is a perspective view of a camera module according to the present embodiment; FIG. 2 is an exploded perspective view of a camera module according to the present embodiment viewed from the upper direction; FIG.

Figure 4:
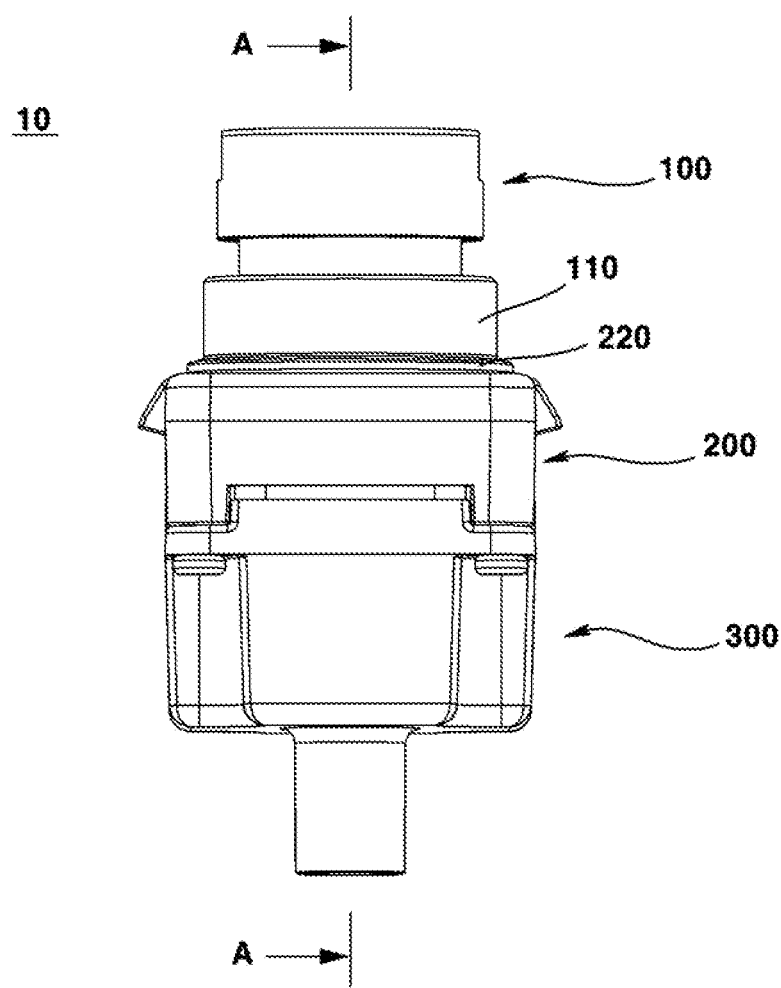
FIG. 4 is a side view of a camera module according to the present embodiment.
Figure 5:
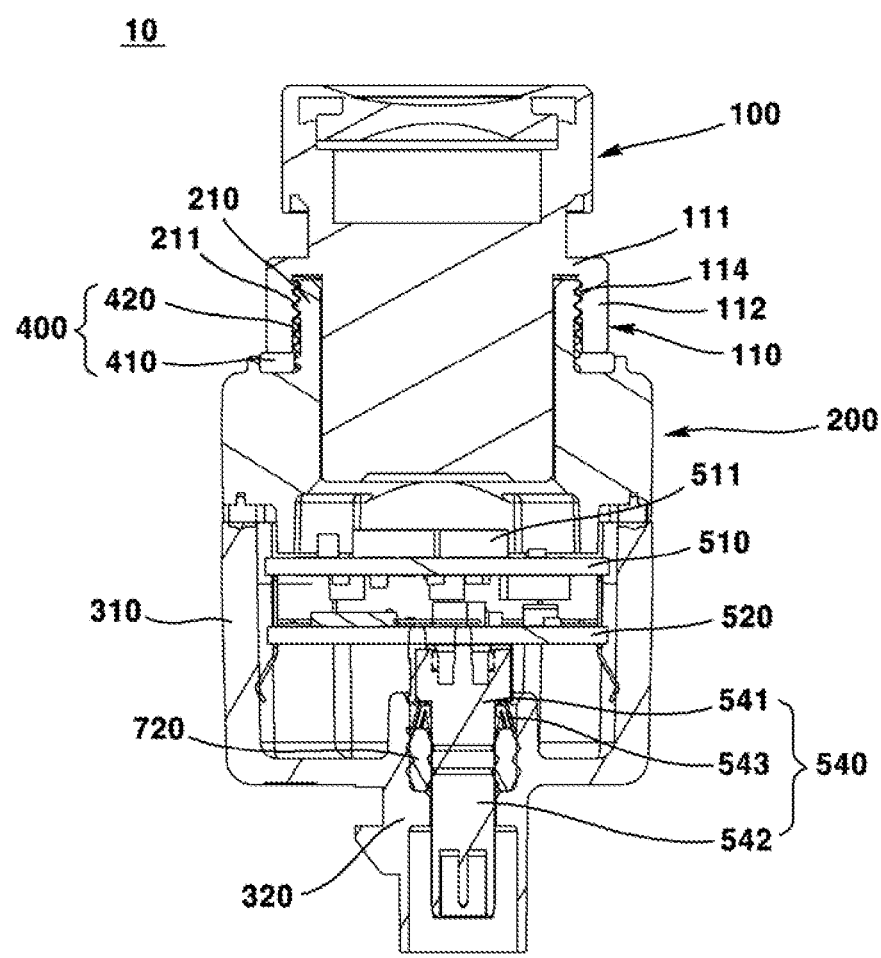
FIG. 5 is a cross-sectional view taken along line A-A of FIG. 4.
Figure 6:
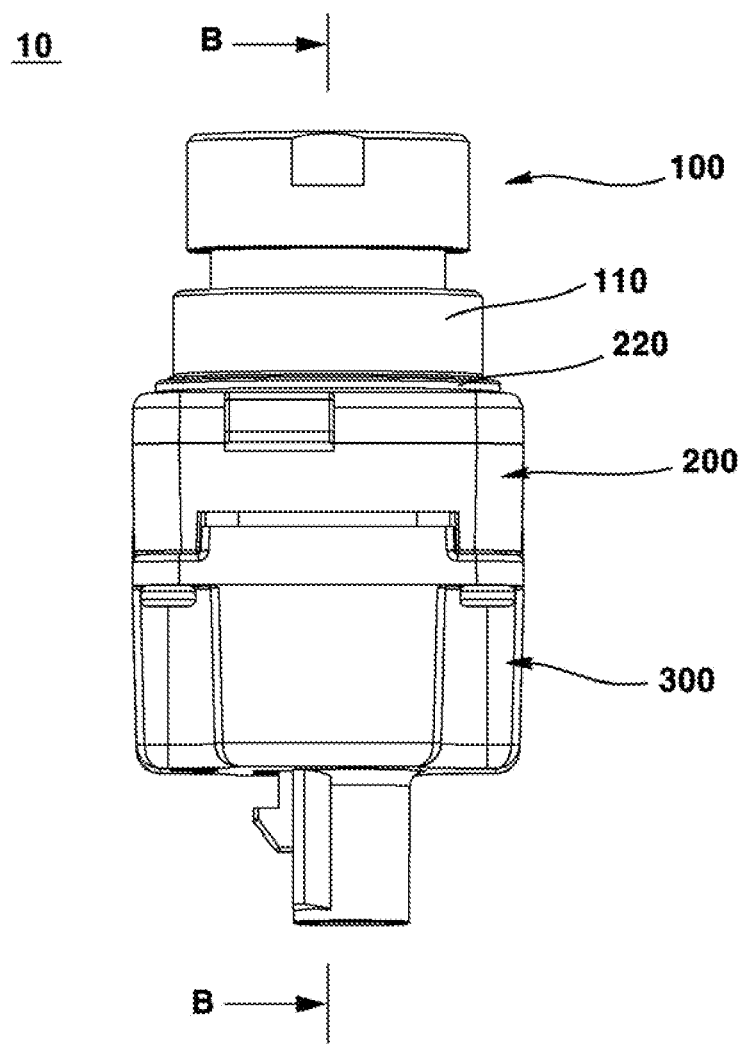
FIG. 6 is a side view of a camera module according to the present embodiment viewed from another angle.
Figure 7:
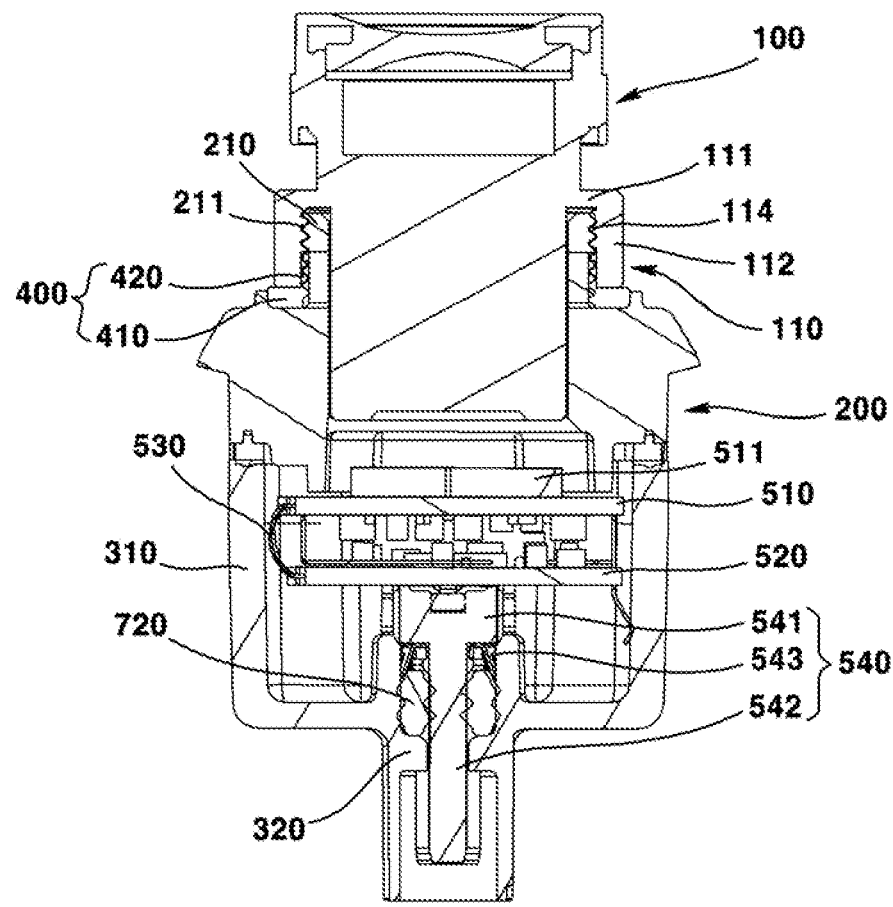
FIG. 7 is a cross-sectional view taken along line B-B of FIG. 6.
Figure 8:
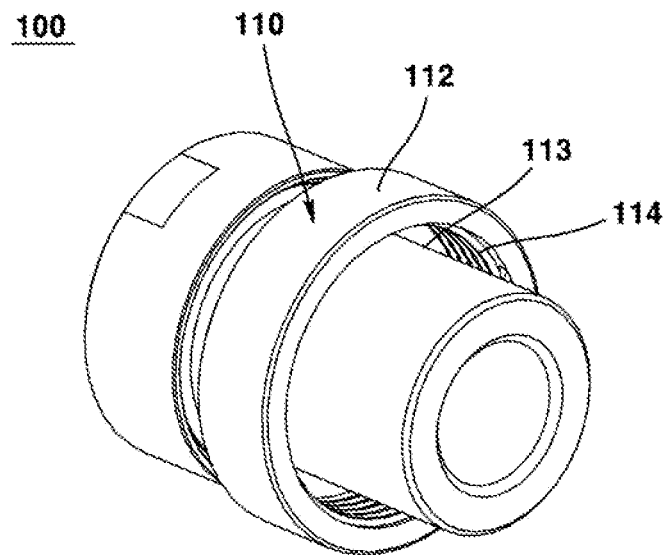
FIG. 8 is a perspective view of a lens holder of a camera module according to the present embodiment.
Figure 9:
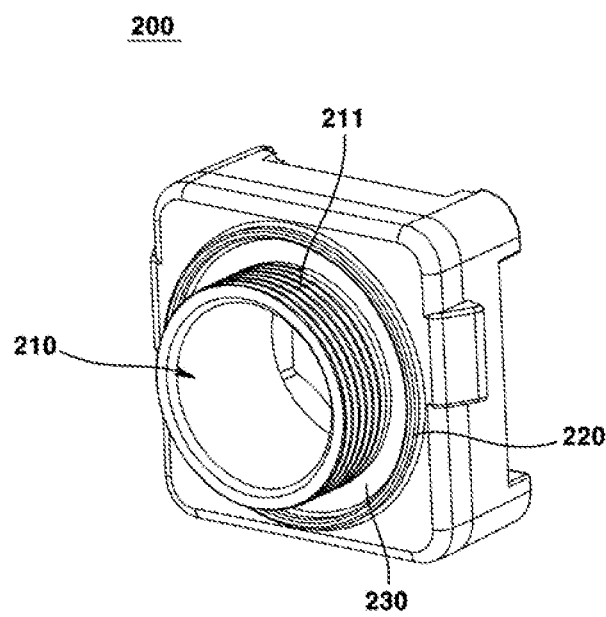
FIG. 9 is a perspective view of the first body of a camera module according to the present embodiment viewed from the upper direction.
Figure 10:
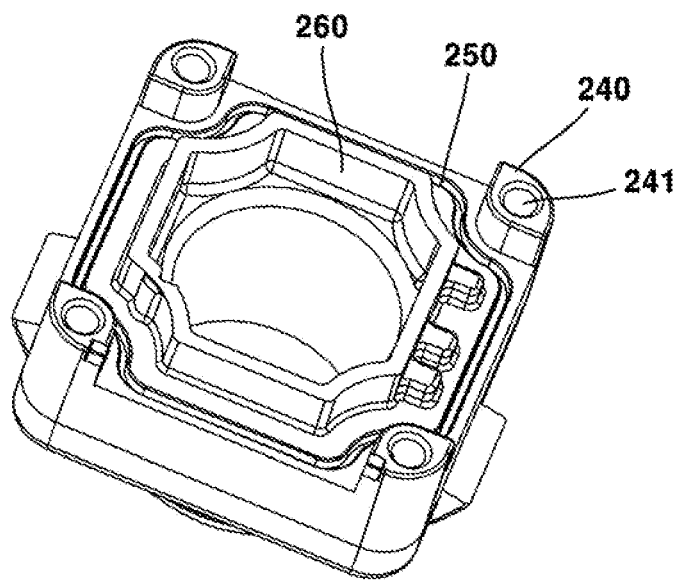
FIG. 10 is a perspective view of a first body of a camera module according to the present embodiment viewed from the downward direction.
Figure 11:
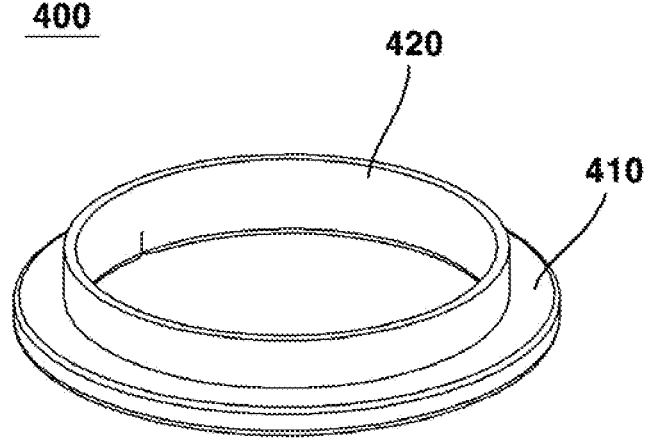
FIG. 11 is a perspective view of a fixing member of a camera module according to the present embodiment.
Figure 12:
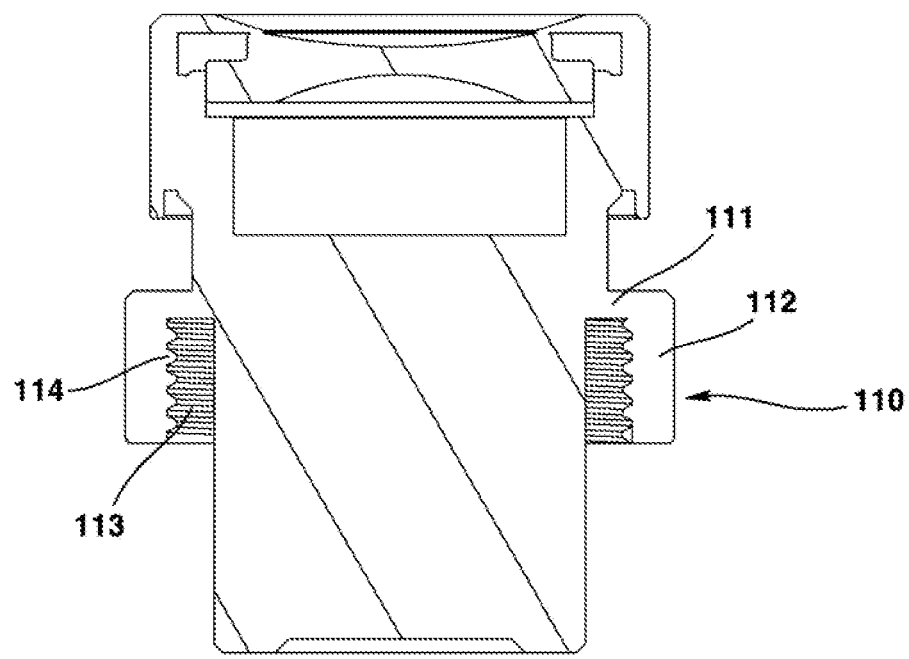
FIG. 12 is a cross-sectional view of a lens holder of a camera module according to the present embodiment.
Figure 13:
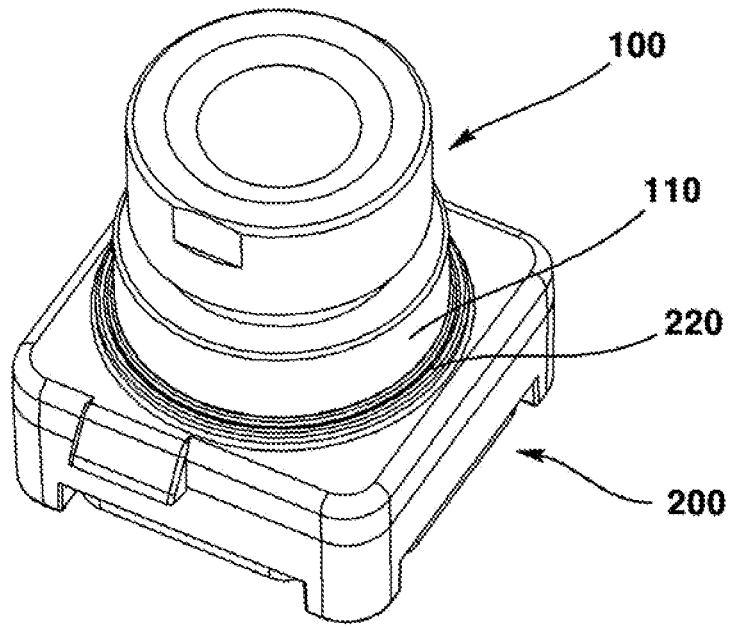
FIG. 13 is a perspective view illustrating a lens holder, a first body, and a fixing member of a camera module according to the present embodiment.
Figure 14:
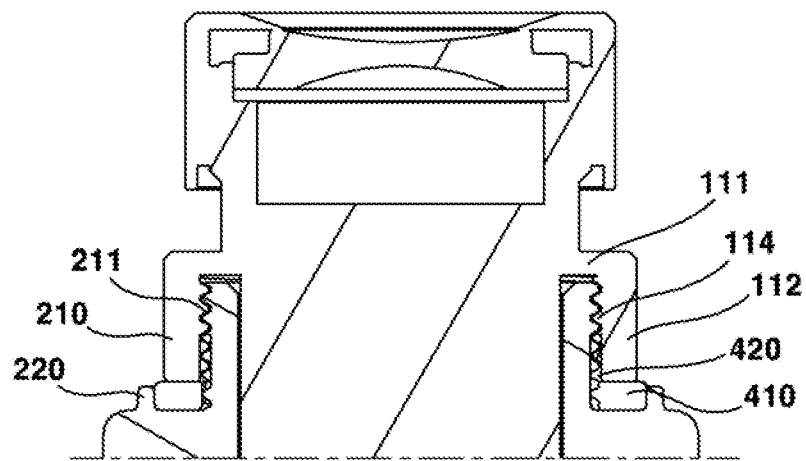
FIG. 14 is a cross-sectional view of FIG. 13.

3 is an exploded perspective view of a camera module according to the present embodiment viewed from the downward direction; FIG. 4 is a side view of a camera module according to the present embodiment; FIG. 5 is a cross-sectional view taken along line A-A of FIG. 4; FIG. 6 is a side view of a camera module according to the present embodiment viewed from another angle; FIG. 7 is a cross-sectional view taken along line B-B of FIG. 6; FIG. 8 is a perspective view of a lens holder of a camera module according to the present embodiment; FIG. 9 is a perspective view of the first body of a camera module according to the present embodiment viewed from the upper direction; FIG. 10 is a perspective view of a first body of a camera module according to the present embodiment viewed from the downward direction; FIG. 11 is a perspective view of a fixing member of a camera module according to the present embodiment; FIG. 12 is a cross-sectional view of a lens holder of a camera module according to the present embodiment; FIG. 13 is a perspective view illustrating a lens holder, a first body, and a fixing member of a camera module according to the present embodiment; and FIG. 14 is a cross-sectional view of FIG. 13.

The camera module 10 according to an embodiment of the present invention may be a vehicle camera module. The camera module 10 may be coupled to a vehicle. The camera module 10 may be used in any one or more among a front camera, a side camera, a rear camera, and a black box of a vehicle. The camera module 10 may be disposed in front of a vehicle. The camera module 10 may be disposed at a rear of a vehicle. The camera module 10 may be coupled to a windshield of a vehicle. The camera module 10 may be coupled to a windshield at a front or rear of a vehicle. The camera module 10 may be disposed at a side of a vehicle. The camera module 10 may photograph a subject and output it as an image on a display (not shown).

The camera module 10 may include a lens holder 100. The lens holder 100 may be formed of a metal material. The lens holder 100 may be formed of an aluminum material. The lens holder 100 may be disposed in the first body 200. The lens holder 100 may be coupled to the first body 200. At least a portion of the lens holder 100 may be disposed in the first body 200. The lens holder 100 may include a lens. The lens may include a plurality of lenses. The lens may be coupled to the lens holder 100. The lens may be disposed inside the lens holder 100. The lens may be aligned with the image sensor 511. The lens may be optically aligned with the image sensor 511. The optical axis of the lens may coincide with the central axis of the image sensor 511. The first body 200 may include an infrared filter (IR filter) being disposed between the lens module 140 and the image sensor 317. The lens holder 100 may include a first outer peripheral surface and a second outer peripheral surface being disposed outside the first outer peripheral surface. The outer peripheral surface of the lens holder 110 may be formed without a screw thread. The outer peripheral surface of the lens holder 110 may not include a screw thread. The first outer peripheral surface and the second outer peripheral surface of the lens holder 110 may be formed without a screw thread.

The lens holder 100 may include a first coupling part 110. The first coupling part 110 may be protruded outward from an outer peripheral surface of the lens holder 100. The first coupling part 110 may be protruded outward from at least a portion of an outer peripheral surface of the lens holder 100. The first coupling part 110 may be coupled to the first body 200. The first coupling part 110 may be coupled to the second coupling part 210 of the first body 200. The first coupling part 110 may be screw-coupled to the second coupling part 210 of the first body 200. At least a portion of the first body 200 may be accommodated inside the first coupling part 110. The first coupling part 110 may not be overlapped with the image sensor 511 in an optical axis direction. The first coupling part 110 may be disposed at more outer side than the image sensor 511. Through this, it is possible to prevent foreign substances from falling to the surface of the image sensor 511 due to the abrasion during the screw thread coupling between the first coupling part 110 and the second coupling part 210.

The first coupling part 110 may include: a first portion 111 being extended outwardly from an outer peripheral surface of the lens holder 100; and a second portion 112 being extended downwardly from the first portion 111. The first portion 111 may be overlapped with the second coupling part 210 of the first body 200 in an optical axis direction. The first portion 111 may not be overlapped with the image sensor 511 in an optical axis direction. The first portion 111 may be disposed at more outer side than the image sensor 511.

The second portion 112 may be spaced apart from an outer peripheral surface of the lens holder 100. The second portion 112 may be spaced apart from an outer peripheral surface of the lens holder 100 in a direction perpendicular to the optical axis direction. The second portion 112 may be spaced apart from a first outer peripheral surface of the lens holder 100 in a direction perpendicular to the optical axis direction. The second portion 112 may face the first outer peripheral surface of the lens holder 100. The length of the second portion 112 in an optical axis direction may be shorter than the length of the second coupling part 210 of the first body 200 in an optical axis direction. The second portion 112 may be spaced apart from the groove 230 of the first body 200 in an optical axis direction. The second portion 112 may be disposed above the body 410 of the fixing member 400. The body 410 of the fixing member 400 may be disposed between the second portion 112 and the groove 230 of the first body 200. The second portion 112 may be coupled to the second coupling part 210 of the first body 200. The second portion 112 may be screw-coupled to the second coupling part 210 of the first body 200. The second portion 112 may not be overlapped with the image sensor 511 in an optical axis direction. The second portion 112 may be disposed at more outer side than the image sensor 511.

An inner peripheral surface of the second portion 112 may face an outer peripheral surface of the lens holder 100. A screw thread 114 may be formed in the inner peripheral surface of the second portion 112. At least a portion of the fixing member 400 may be disposed in an inner peripheral surface of the second portion 112. An extension portion 420 of the fixing member 400 may be disposed in an inner peripheral surface of the second portion 112.

The first coupling part 110 may include a groove 113. The groove 113 may be recessed from a lower end of the first coupling part 110. The groove 113 may be recessed from a lower end of the second portion 112 of the first coupling part 110. The groove 113 may be formed between the second portion 112 of the first coupling part 110 and a first outer peripheral surface of the lens holder 100. The groove 113 may be formed between an inner peripheral surface of the second portion 112 of the first coupling part 110 and a first outer peripheral surface of the lens holder 100. At least a portion of the first body 200 may be disposed in the groove 113. The second coupling part 210 of the first body 200 may be inserted into the groove 113. The depth of the groove 113 in an optical axis direction may be lower than the depth of the second coupling part 210 of the first body 200 in a corresponding direction. The width of the groove 113 in a direction perpendicular to the optical axis direction may correspond to the width of the second coupling part 210 of the first body 200 in a corresponding direction. The groove 113 may be formed in a shape corresponding to the second coupling part 210 of the first body 200.

The first coupling part 110 may include a screw thread 114. The screw thread 114 may be formed in the first coupling part 110. The screw thread 114 may be formed in the groove 113 of the first coupling part 110. The screw thread 114 may be formed in the inner peripheral surface of the second portion 112 of the first coupling part 110. The screw thread 114 may face the outer peripheral surface of the lens holder 100. The screw thread 114 may face the first outer peripheral surface of the lens holder 100. The screw thread 114 may be formed in a shape corresponding to the screw thread of the second coupling part 210 of the first body 200. The screw thread 114 may be screw-coupled to the screw thread of the second coupling part 210 of the first body 200.

The camera module 10 may include a first body 200. The first body 100 may be referred to as a first housing or a front body. The first body 200 may be formed in a rectangular shape with an open lower portion. The first body 200 may be formed of a metal material. The first body 200 may be formed of an aluminum material. The first body 200 may be a metal body. The first body 200 and the second body 300 may form the outer appearance of the camera module 10. The first body 200 may be combined with the second body 300 to form an internal space. The first body 200 may be coupled to the second body 300. The first body 200 may be screw-coupled to the second body 300.

The first body 200 may include a second coupling part 210. It may be protruded upward from an upper surface of the first body 200. The second coupling part 210 may be coupled to the lens holder 100. The second coupling part 210 may be coupled to the first coupling part 110 of the lens holder 100. The second coupling part 210 may be inserted into the groove 113 of the first coupling part 110 of the lens holder 100. The second coupling part 210 may be disposed in the groove 113 of the first coupling part 110 of the lens holder 100. The length of the second coupling part 210 in an optical axis direction may be longer than the length of the second portion 112 of the first coupling part 110 of the lens holder 100 in a corresponding direction. The inner peripheral surface of the second coupling part 210 may be in contact with a first outer peripheral surface of the lens holder 100. The inner peripheral surface of the second coupling part 210 may be formed without a screw thread. The inner peripheral surface of the second coupling part 210 may include a screw thread.

The second coupling part 210 may include a screw thread 211. The screw thread 211 may be formed in an outer peripheral surface of the second coupling part 210. The screw thread 211 may face the screw thread 114 of the first coupling part 110 of the lens holder 100. The screw thread 211 may be engaged with the screw thread 114 of the first coupling part 110 of the lens holder 100. The screw thread 211 may be formed in a shape corresponding to the screw thread 114 of the first coupling part 110 of the lens holder 100. The screw thread 211 may be screw-coupled to the screw thread 114 of the first coupling part 110 of the lens holder 100.

The first body 200 may include an extension portion 220. The extension portion 220 may be protruded upward from an upper surface of the first body 200. The extension portion 220 may be disposed at more outer side than the second coupling part 210. The height of the extension portion 220 in an optical axis direction may be lower than the height of the second coupling part 210 in a corresponding direction. The extension portion 220 may not be overlapped with the first coupling part 110 of the lens holder 100 in a direction perpendicular to the optical axis direction. The extension portion 220 may not be overlapped with a second portion 112 of the first coupling part 110 of the lens holder 100 in a direction perpendicular to the optical axis direction. The extension portion 220 may not be overlapped with the image sensor 511 in an optical axis direction. The extension portion 220 may be disposed at more outer side than the image sensor 511. Through this, it is possible to prevent foreign substances from falling to the surface of the image sensor 511 due to the abrasion during the screw thread coupling between the first coupling part 110 and the second coupling part 210.

The first body 200 may include a groove 230. The groove 230 may be formed between the second coupling part 210 and the extension portion 220. The groove 230 may be formed by the upper surface of the first body 200, the second coupling part 210, and the extension portion 220. The bottom surface of the groove 230 may be disposed on the same plane as the upper surface of the first body 200. The groove 230 may be overlapped with at least a portion of the first coupling part 110 of the lens holder 100 in an optical axis direction. The groove 230 may be overlapped with the second portion 112 of the first coupling part 110 in an optical axis direction. The bottom surface of the groove 230 may be spaced apart from the second portion 112 of the first coupling part 110 in an optical axis direction. The groove 230 may not be overlapped with the image sensor 511 in an optical axis direction. The groove 230 may be disposed at more outer side than the image sensor 511. Through this, it is possible to prevent foreign substances from falling to the surface of the image sensor 511 due to the abrasion during the screw thread coupling between the first coupling part 110 and the second coupling part 210. A fixing member 400 may be disposed in the groove 230. At least a portion of the fixing member 400 may be disposed in the groove 230.

The first body 200 may include a pillar 240 being protruded from a lower surface of the first body 200. The pillar 240 may include four pillars 240. The pillar 240 may be formed at positions corresponding to the four corners of the second body 300. The pillar 240 may be disposed in the groove 340 of the second body 300. The pillar 240 may include a groove 241. The groove 241 may be recessed from a lower end of the pillar 240. A coupling member 800 may be disposed in the groove 241. At least a portion of the coupling member 800 may be disposed in the groove 241. The inner peripheral surface of the groove 241 may have a shape corresponding to the shape of an outer peripheral surface of the coupling member 800. The inner peripheral surface of the groove 241 may include a screw thread shape. The groove 241 may be screw-coupled to the coupling member 800. Through this, the first body 200 and the second body 300 may be coupled.

The first body 200 may include a groove 250 being formed on a lower surface of the first body 200. A first sealing member 710 may be disposed in the groove 250. At least a portion of the first sealing member 710 may be disposed in the groove 250. A protruded portion 711 of the first sealing member 710 may be disposed in the groove 250. The groove 250 may be the one for fixing the first sealing member 710 being disposed in the first body 200 when the first body 200 and the second body 300 are assembled. The groove 250 may be formed in a round shape at a portion corresponding to the pillar. The groove 250 may be concavely bent at a portion corresponding to the pillar. A portion of the groove 250 facing the pillar may have a round shape. A portion of the groove 250 facing the pillar may be bent in a shape corresponding to the pillar. The round shape of the groove 250 may be to avoid pillars.

The first body 200 may include a protruded portion 260. The protruded portion 260 may be protruded downward from the first body 200. The protruded portion 260 may be disposed at more inner side than the pillar. A first substrate 510 may be disposed in the protruded portion 260. The protruded portion 260 may be coupled to the first substrate 510. The protruded portion 260 may be coupled to an outer edge of the first substrate 510. The protruded portion 260 may be formed to have a shape corresponding to the shape of the outer edge of the first substrate 510.

The camera module 10 may include a second body 300. The second body 300 may be referred to as any one among a rear body, a lower housing, and a second housing. The second body 300 may be formed of a metal material. The second body 300 may be a metal body. The second body 300 may be formed in a rectangular shape with an open upper portion. The second body 300 may be disposed below the first body 200. The second body 300 may be coupled to the first body 200. The second body 300 may be screw-coupled to the first body 200. The second body 300 may form an internal space through coupling with the first body 200. A first sealing member 710 may be disposed at an upper portion of the second body 300.

The second body 300 may include a bottom plate 310 and a side plate 320 being extended from the bottom plate 310. The side plate 320 may be extended upward from an edge of the bottom plate 310. The second body 300 may include a plurality of side plates 320 and corners being formed between the plurality of side plates 320. The second body 300 may include four side plates 320 and four corners being disposed between the four side plates 320.

The second body 300 may include a groove 340 being formed on an upper surface being coupled to the first body 200. The groove 340 may be formed at positions corresponding to the four corners of the second body 300. The groove 340 may be overlap with the pillar of the first body 200 in an optical axis direction. A pillar of the first body 200 may be disposed in the groove 340. A hole 341 may be formed in the groove 340. The hole 341 may be overlapped with the groove 241 of the pillar of the first body 200 in an optical axis direction. The coupling member 800 may penetrate through the hole 341. An inner peripheral surface of the hole 341 may have a shape corresponding to an outer peripheral surface of the coupling member 800. An inner peripheral surface of the hole 341 may include a screw thread shape. The coupling member 800 penetrated through the hole 341 may be disposed in the groove 241 of the pillar of the first body 200.

The second body 300 may include a connector lead-out part 330. The connector lead-out part 330 may be formed in a cylindrical shape. The connector lead-out part 330 may be coupled to the second body 300. The connector lead-out part 330 may penetrate the bottom plate 310 of the second body 300. At least a portion of the connector lead-out part 330 may be disposed inside the second body 300, and the remaining portion of the connector lead-out part 330 may be exposed to the outside of the second body 300.

The connector lead-out part 330 may be coupled to the bottom plate 310 of the second body 300. A connector 540 may be disposed inside the connector lead-out part 330. A second connector 542 may be disposed inside the connector lead-out part 330. The connector lead-out part 330 may include a hole. A connector 540 may be disposed in the hole. The hole of the connector lead-out part 330 may accommodate at least a portion of the connector 540. Through this, the connector lead-out part 330 may fix the connector 540.

The camera module 10 may include a fixing member 400. The fixing member 400 may be an epoxy. The first coupling part 110 of the lens holder 100 and the second coupling part 210 of the first body 200 may be screw-coupled together in a state in which the fixing member 400 is injected into the groove 230 of the first body 200.

The fixing member 400 may include a body 410. The body 410 may be disposed in the first body 200. The body 410 may be disposed in the groove 230 of the first body 200. The body 410 may be accommodated in the groove 230 of the first body 200. At this time, the body 410 may be injected slightly overflowing into the groove 230 of the first body 200. Through this, the fixing member 400, which is an epoxy, may be cured to increase the fixing force. In addition, by the screw-coupling between the lens holder 100 and the first body 200 at least a portion of the body 410 of the fixing member 400 may be extended between the screw thread 114 of the first coupling part 110 and the screw thread 211 of the second coupling part 210.

The fixing member 400 may include an extension portion 420. The extension portion 420 may be extended upwardly from the body 410. The extension portion 420 may be extended upwardly from at least a portion of the body 410. The extension portion 420 may be extended from the body 410 toward between the screw thread 114 of the first coupling part 110 and the screw thread 211 of the second coupling part 210. The extension portion 420 may be a portion being formed as it travels upward according to the screw-coupling between the lens holder 100 and the first body 200. The extension portion 420 may be a portion being formed as it travels upward according to the screw-coupling between the first coupling part 110 of the lens holder 100 and the second coupling part 210 of the first body 200.

The extension portion 420 may be disposed in the inner peripheral surface of the first coupling part 110. The extension portion 420 may be disposed in at least a portion of an inner peripheral surface of the first coupling part 110. The extension portion 420 may be disposed in the screw thread 114 of the first coupling part 110. The extension portion 420 may be disposed in an outer peripheral surface of the second coupling part 210. The extension portion 420 may be disposed in at least a portion of an outer peripheral surface of the second coupling part 210. The extension portion 420 may be disposed in the screw thread 211 of the second coupling part 210. The length of the extension portion 420 in an optical axis direction may be smaller than the length of the first coupling part 110 in an optical axis direction. The length of the extension portion 420 in an optical axis direction may be smaller than the length of the second coupling part 210 in an optical axis direction. However, it is not limited thereto, and the length of the extension portion 420 in an optical axis direction may be changed according to the amount of the fixing member 400 applied to the groove 230 of the first body 200.

The extension portion 420 is disposed in a gap between the screw thread 114 of the first coupling part 110 and the screw thread 211 of the second coupling part 210 so that the lens holder 100 may be firmly fixed. Through this, it is possible to prevent the lens holder 100 from being detached and removed from the first body 200 due to an impact such as vibration or shaking of the vehicle. That is, the fixing member 400 may be an epoxy for fixing the lens. In addition, the extension portion 420 is disposed in a gap between the screw thread 114 of the first coupling part 110 and the screw thread 211 of the second coupling part 210 so that it is possible to prevent the penetration of moisture into the coupling surface of the lens holder 100 and the first body 200. That is, the fixing member 400 may perform waterproofing function.

The camera module 10 may include a substrate assembly 500.

The camera module 10 may include a substrate assembly 500. The substrate assembly 400 may be disposed inside the second body 300. The substrate assembly 500 may be disposed in an internal space formed by the coupling of the first body 200 and the second body 300.

The substrate assembly 500 may include a first substrate 510. The first substrate 510 may include a printed circuit board. The first substrate 510 may include a rigid printed circuit board. An image sensor 511 may be disposed in the first substrate 510. At this time, the first substrate 510 may be referred to as a sensor substrate. The first substrate 510 may include a first surface facing the first body 200 and a second surface disposed at an opposite side of the first surface. The image sensor 511 may be coupled to the first body 200 at an outer edge area of the first surface of the first substrate 510.

The substrate assembly 500 may include a second substrate 520. The second substrate 520 may include a printed circuit board. The second substrate 520 may include a rigid printed circuit board. The second substrate 520 may be disposed below the first substrate 510. The second substrate 520 may be spaced apart from the first substrate 510. The second substrate 520 may be spaced apart from the first substrate 510 in an optical axis direction. The second substrate 520 may supply power to the first substrate 510. The second substrate 520 may be disposed parallel to the first substrate 510. The second substrate 520 may be electrically connected to the connector 540. The second substrate 520 may include a first surface facing the first substrate 510 and a second surface being disposed at an opposite side of the first surface. A connector 540 may be disposed in a second surface of the second substrate 520. A first connector 541 may be disposed in a second surface of the second substrate 520. The second substrate 520 may be electrically connected to the first connector 541.

The substrate assembly 500 may include a third substrate 530. The third substrate 530 may include a flexible printed circuit board (FPCB). The third substrate 530 may electrically connect the first substrate 510 and the second substrate 520. One end of the third substrate 530 may be connected to the first substrate 510, and the other end of the third substrate 530 may be connected to the second substrate 520. The third substrate 530 may have elasticity.

The substrate assembly 300 may include a connector 540. The connector 540 may electrically connect a cable (not shown) to the second substrate 420. The connector 540 may include a first connector 541 being electrically connected to the second substrate 320, and a second connector being extended from the first connector 541 and electrically connecting the first connector 541 and the cable 542. The first connector 541 may be disposed in a second surface of the second substrate 320. The first connector 541 may be fixed to a second surface of the second substrate 320. The first connector 541 may be electrically connected to the second substrate 420. The second connector 542 may be electrically connected to the first connector 541. The second connector 542 may be electrically connected to the cable. The second connector 542 may be disposed in the connector lead-out part 220 of the second body 200. At least a portion of the second connector 542 may be disposed inside the connector lead-out part 220 of the second body 200, and the remaining portion of the second connector 362 may be disposed inside the second body 200.

The substrate assembly 300 may include a grounding member 543. The grounding member 543 may include a washer. The grounding member 543 may be integrally formed with the connector 540. The grounding member 543 may be coupled to the first connector 541. A second connector 542 may be disposed inside the grounding member 543. One end of the grounding member 543 may be coupled to the first connector 541, and the other end of the grounding member 543 may not come into contact with the first and second connectors 542.

The camera module 10 may include a shield member 600. The shield member 600 may be referred to as any one among a spacer, a shield can, and a support member. The shield member 600 may be an electromagnetic wave shielding member. The shield member 600 may block electromagnetic interference (EMI) or electromagnetic waves.

The shield member 600 may be disposed below the first substrate 310. The shield member 600 may be disposed in the second substrate 320. The shield member 600 may be disposed between the first substrate 310 and the second substrate 320. The shield member 600 may separate the first substrate 310 and the second substrate 320 in an optical axis direction.

The camera module 10 may include a first sealing member 710. The first sealing member 710 may be referred to as any one of a gasket and a waterproof member. The first sealing member 710 may be formed of an elastic material. The first sealing member 710 may be formed in a shape corresponding to the shape of the outer edge of the first substrate 510. The first sealing member 710 may be formed to be larger than the outer edge of the first substrate 510. The first sealing member 710 may be disposed outside the outer edge of the first substrate 510. The first sealing member 710 may be disposed in the first body 200. The first sealing member 710 may be disposed between the first body 200 and the third body 200. The first sealing member 710 may be disposed in a space between the first body 200 and the second body 300. The height of the first sealing member 710 in an optical axis direction may become smaller after assembly than before assembly. That is, the first sealing member 710 may be disposed between the first body 200 and the second body 300 in a compressed state in an optical axis direction to perform a waterproof function. Through this, it is possible to prevent moisture from penetrating through the space between the first body 200 and the second body 300.

The first sealing member 710 may include a protruded portion 711. The protruded portion 711 may be protruded from at least a portion of a surface of the first sealing member 710 facing the first body 200. The protruded portion 711 may be inserted into the groove portion 115 of the first body portion 110. The protruded portion 711 and the groove portion 115 of the first body portion 110 may prevent the first sealing member 710 from being moved when the first body 200 and the second body 200 are assembled. That is, when assembling the first body 200 and the second body 200, the second body 100 is coupled to the first body 200 in a state in which the first sealing member 710 is mounted on the first body 200, at this time, the first sealing member 710 may serve to guide the position so that it does not deviate from the original position.

The camera module 10 may include a second sealing member 720. The second sealing member 720 may be a waterproof member. The second sealing member 720 may be formed of a material having elasticity. It is possible to prevent moisture from penetrating between the second body 300 and the connector 540. The second sealing member 720 may be spaced apart from the ground member 543 in an optical axis direction. The second sealing member 720 may be disposed at a lower position than the second substrate 520. The second sealing member 720 may be disposed in the second connector 542. The second sealing member 720 may be disposed in the second body 300. The second sealing member 720 may be disposed in the connector lead-out part 330 of the second body 300. Through this, it is possible to prevent moisture from penetrating between the second body 300 and the connector 540.

The camera module 10 may include a coupling member 800. The coupling member 800 may couple the first body 200 and the second body 300. The coupling member 800 may screw-couple the first body 200 and the second body 300 to each other. The coupling member 800 may include a bolt. The coupling member 800 may include a screw. A screw thread may be formed on an outer peripheral surface of the coupling member 800. The coupling member 800 may be coupled to the hole 341 of the second body 300. The coupling member 800 may penetrate through the hole 341 of the second body 300. The coupling member 800 penetrating through the hole 341 of the second body 300 may be disposed in the groove 241 of the pillar of the first body 200. Through this, the coupling member 800 may couple the first body 200 and the second body 300.

Hereinafter, the foreign substances movement path of the camera module 10 according to the present embodiment will be described in detail with reference to the drawings.

Figure 15:
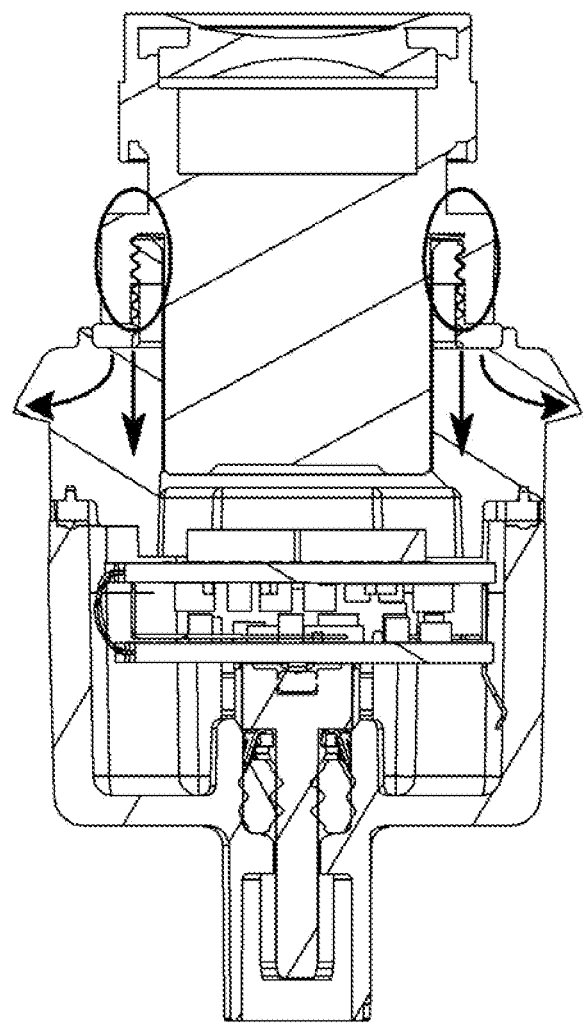
FIG. 15 is a diagram illustrating a movement path of foreign substances of a camera module according to the present embodiment.

FIG. 15 is a diagram illustrating a movement path of foreign substances of a camera module according to the present embodiment.

A conventional camera module has a thread-coupling structure between an outer peripheral surface of a lens holder and an inner peripheral surface of a first body. In this case, foreign substances are generated by the screw thread when the lens holder and the first body are assembled, and the generated foreign substances fall to the image sensor through the gap between the outer peripheral surface of the lens holder and the inner peripheral surface of the first body, so there is a problem of black pixel development and/or yokes in the output image.

Referring to FIG. 15, in the camera module 10 according to the present embodiment, the outer peripheral surface of the lens holder 100 and the inner peripheral surface of the first body 200 do not include a screw thread shape. In this case, when assembling the lens holder 100 and the first body 200, foreign substances are not generated between the outer peripheral surface of the lens holder 100 and the inner peripheral surface of the first body 200, so that the image sensor of black pixels can be prevented. In addition, the camera module 10 according to the present embodiment forms a screw coupling structure (thread type) outside the outer peripheral surface of the lens holder 100 and outside the inner peripheral surface of the first body 200. In this case, since they are screw-coupled at an outer side of an outer peripheral surface of the lens holder 100 and at an outer side of an inner peripheral surface of the first body 200, the foreign substances from abrasion are settled down not on the image sensor 551, but on the groove 230. Through this, the path through which the foreign substances from abrasion due to the screw-coupling fall on to the image sensor 551 is fundamentally blocked to prevent the black pixel phenomenon of the image sensor 551, and it is possible to prevent a yoke from occurring in the image being outputted from the image sensor 551. Furthermore, the conventional camera module uses an O-ring between the lens holder and the first body for waterproofing, but foreign substances from abrasion due to screw-coupling are introduced into the O-ring, and there are problems of poor assembly and poor waterproofing. On the other hand, the camera module according to the present embodiment, by applying a structure in which O-ring is deleted, fundamentally blocks the problems of occurring poor assembly and poor waterproofing when the foreign substances from abrasion are introduced into the O-ring so that the waterproofing function can be secured through the lens holder fixing member 400 made of an epoxy material.

The camera module 10 according to the present embodiment can prevent foreign substances from falling to the image sensor surface by changing the position of the screw thread coupling structure between the lens holder 100 and the front body 200. In addition, it is possible to minimize assembly man-hours and assembly defects by eliminating the structure in which O-ring is applied. In addition, by applying epoxy between the lens holder 100 and the front body 200, the lens holder can be firmly fixed and a waterproof function can be performed.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:
1. A camera module comprising:
a first body;
a lens holder being coupled to the first body; and
a second body being coupled to the first body,
wherein the lens holder comprises a first coupling part comprising a first portion being protruded from an outer peripheral surface of the lens holder and a second portion being extended towards the first body from the first portion,
wherein the first body comprises a second coupling part being coupled to the first coupling part,
wherein the second portion of the first coupling part comprises screw threads being formed on an inner peripheral surface of the second portion,
wherein the second coupling part comprises screw threads being formed on an outer peripheral surface of the second coupling part,
wherein the first body comprises a first protruded portion being protruded from an upper surface of the first body and being disposed at a more outer side than the second coupling part, and a first groove being formed between the second coupling part and the first protruded portion,
wherein a fixing member is disposed in the first groove of the first body,
wherein a height of the first protruded portion in an optical axis direction is lower than a height of the second coupling part in the optical axis direction, and
wherein the first protruded portion is disposed to surround an outer surface of the fixing member.
2. The camera module according to claim 1, wherein the second coupling part is protruded from an upper surface of the first body, wherein the first coupling part comprises a groove being recessed from a lower end of the second part of the first coupling part, and wherein at least a portion of the second coupling part is inserted into the groove of the first coupling part.

3. The camera module according to claim 1, comprising a substrate assembly disposed in the second body, wherein the substrate assembly comprises a substrate and an image sensor being disposed in the substrate.

4. The camera module according to claim 3, wherein the first coupling part and the second coupling part are disposed at more outer side than the image sensor.

5. The camera module according to claim 1, wherein an outer peripheral surface of the lens holder is in contact with an inner peripheral surface of the first body, and wherein the outer peripheral surface of the lens holder and the inner peripheral surface of the first body are formed without a screw thread.

6. The camera module according to claim 1, wherein the fixing member comprises a body being disposed in the first groove of the first body, and an extension portion being extended from at least a portion of the body.

7. The camera module according to claim 6, wherein the extension portion of the fixing member is disposed between the inner peripheral surface of the first coupling part and the outer peripheral surface of the second coupling part.

8. The camera module according to claim 1, wherein the second portion of the first coupling part is overlapped with the groove of the first body in the optical axis direction.

9. The camera module according to claim 7, wherein the extension portion of the fixing member fix the lens holder to the first body.

10. The camera module according to claim 1, wherein the second portion of the first coupling part is spaced apart from the outer peripheral surface of the lens holder in a direction perpendicular to the optical axis direction.

11. The camera module according to claim 1, wherein the first body comprises a second groove being formed the lower surface of the first body, and wherein a first sealing member is disposed in the second groove of the first body.

12. The camera module according to claim 11, wherein the first body comprises a pillar being protruded from the lower surface of the first body, and wherein the pillar comprises four pillars being formed at positions corresponding to four corners of the second body.

13. The camera module according to claim 12, wherein the second groove of the first body is formed in a round shape at a portion corresponding to the pillar.

14. The camera module according to claim 12, wherein the first body comprises a second protruded portion being protruded from the lower surface of the first body and being disposed at more inner side than the pillar, and wherein the second protruded portion of the first body is coupled to a substrate.

15. The camera module according to claim 14, wherein the second protruded portion is formed to have a shape corresponding a shape of an outer edge of the substrate.

16. A camera module comprising:

a first body;

a lens holder being coupled to the first body;

a second body being coupled to the first body; and a substrate assembly being disposed in the second body, wherein the lens holder comprises a first coupling part being protruded from an outer peripheral surface of the lens holder, wherein the first coupling part comprises a groove being recessed from a lower end of the first coupling part, wherein the first body comprises a second coupling part being protruded from an upper surface of the first body and at least a portion of which is disposed in the groove of the coupling part, wherein the first coupling part and the second coupling part are screw coupled, wherein the first body comprises a protruded portion being protruded from the upper surface of the first body and being disposed at a more outer side than the second coupling part, and a first groove being formed between the second coupling part and the protruded portion, wherein a fixing member is disposed in the first groove of the first body, wherein a height of the protruded portion in an optical axis direction is lower than a height of the second coupling part in the optical axis direction, and wherein the protruded portion is disposed to surround an outer surface of the fixing member.

17. The camera module according to claim 16, wherein an outer peripheral surface of the lens holder and the inner peripheral surface of the first body is formed without a screw thread.

18. The camera module according to claim 16, comprising a substrate assembly disposed in the second body, wherein the substrate assembly comprises a substrate and an image sensor being disposed in the substrate, and wherein the first coupling part and the second coupling part are disposed at more outer side than the image sensor.

19. The camera module according to claim 17, wherein the fixing member comprises a body being disposed in the first groove of the first body, and an extension portion being extended from at least a portion of the body.

20. The camera module according to claim 19, wherein the extension portion of the fixing member fix the lens holder to the first body.

* * * * *